J. S. WILLIAMS.
HORSE DETACHER.
APPLICATION FILED SEPT. 25, 1908.
915,006.
Patented Mar. 9, 1909.
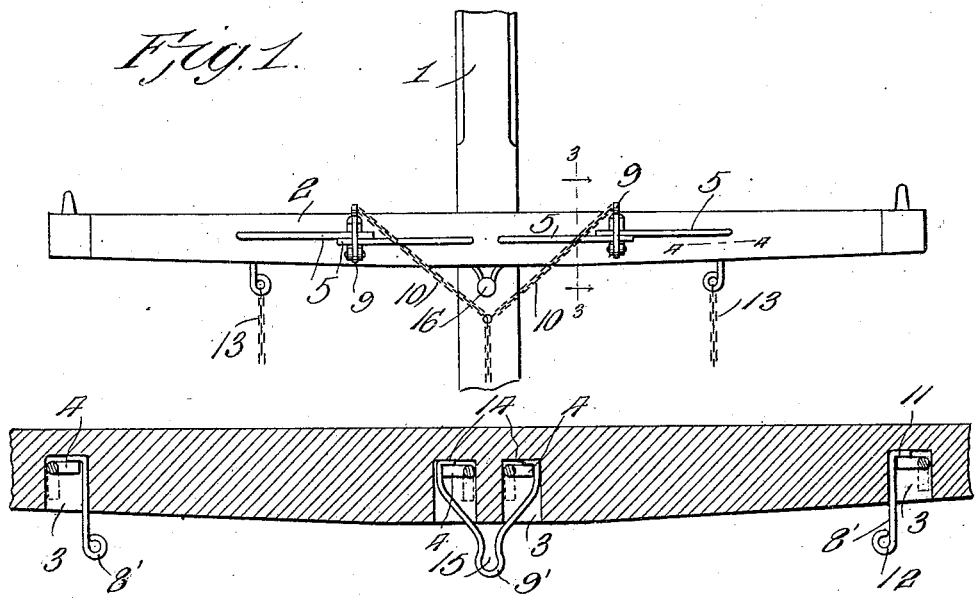
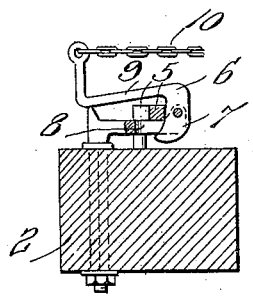
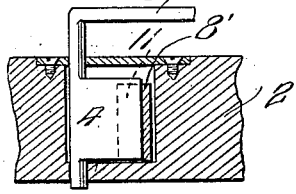
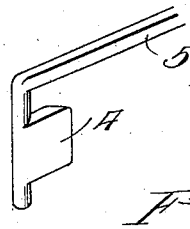
Witnesses
Frank Hough
Wm. J. Koerth
Inventor
John S. Williams,
By Victor J. Evans
Attorney

UNITED STATES PATENT OFFICE.

JOHN S. WILLIAMS, OF HARTFORD, ARKANSAS.

HORSE-DETACHER.

No. 915,006.  Specification of Letters Patent.  Patented March 9, 1909.

Application filed September 25, 1908. Serial No. 454,674.

*To all whom it may concern:*

Be it known that I, JOHN S. WILLIAMS, a citizen of the United States, residing at Hartford, in the county of Sebastian and State of Arkansas, have invented new and useful Improvements in Horse-Detachers, of which the following is a specification.

This invention relates to horse detachers and is primarily intended for use in connection with farm wagons or the like, the object of the invention being to provide a simple and effective device of this character whereby runaway or unmanageable horses may be easily and quickly detached from a wagon or other vehicle without danger of injury to the vehicle or to the persons or articles carried thereby.

With the above and other objects in view, which will appear as the description progresses, the invention resides in the novel construction and arrangement of parts hereinafter fully described and claimed.

In the accompanying drawing I have illustrated a simple and preferred form of the device, but it is to be understood that I do not limit myself to the precise structural details therein shown, as changes and alterations within the scope of the invention may be made when desired.

In the drawing:—Figure 1 is a top plan view of a wagon pole and whiffletree therefor, and illustrating my improved horse detacher in position thereon. Fig. 2 is an enlarged partial longitudinal section of the whiffletree illustrated in Fig. 1. Fig. 3 is a transverse sectional view upon the line 3—3 of Fig. 1, the section being slightly enlarged to more clearly illustrate the parts. Fig. 4 is an enlarged detail sectional view upon the line 4—4 of Fig. 1. Fig. 5 is a perspective view of the end of one of the operating arms.

In the accompanying drawing, the numeral 1 designates the pole of an ordinary farm wagon or other vehicle. The pole 1 is provided with the usual whiffletree 2, which, in this instance carries the detaching elements hereinafter to be fully described. The whiffletree has its ends provided with the usual hooks, by which the swingletrees are attached, and the whiffletree is also provided with a plurality of openings 3 extending inwardly from the face of the tree nearest the wagon or other vehicle. As clearly illustrated in Fig. 2 of the drawings, a pair of these openings 3 are arranged approximately central of the whiffletree and are divided from each other by a narrow wall or partition, while the remaining openings are spaced a suitable distance from each side of the center of the whiffletree. Positioned within each of these openings 3 are the knuckle members 4 of the detaching arms 5. The offset portions of the arms 5 upon which the knuckles 4 are formed are trunnioned in suitable bearings provided by the whiffletree whereby the knuckles may be swung in a manner hereinafter to be described. The knuckle members 4 are positioned a slight distance away from the inner walls of the openings 3, and by reference to Fig. 2 of the drawings, it will be noted each pair of the knuckles have their vertical edges facing each other and the arms 5 of each pair extend toward each other upon the top of the whiffletree and are adapted to be retained in locked position with each other and upon the whiffletree through the medium of the latches 6. These latches 6 are provided with enlarged face portions 7 pivotally connected to the offset portion of a supporting member 8. The latch members 6 are also provided with an offset arm 9 adapted to lie at an angle upon the supporting member 8 and to have its free extremity bent upwardly and provided with a suitable opening which is also adapted for the reception of suitable flexible elements 10, by which the device is operated so as to allow the arms 5 and their knuckles 4 to swing when the animal is to be detached in a manner now to be described. Positioned within the openings 3 of the whiffletree and adapted to engage between the face of the openings 3 and the knuckles 4 are the offset portions 11 of the hooked members 8' and 9'. The hooked members 8' preferably comprise a straight body portion from which is formed the offset 11 upon one end and an eye 12 upon the opposite end. This eye 12 is adapted for the reception of a flexible element 13, which extends rearwardly and may be attached to any portion of the running gear of the wagon.

The central hook member 9' is preferably constructed of a single piece of suitable material and is provided with oppositely disposed offset members 14 which are adapted to be positioned between the inner faces provided by the central openings 3 and the knuckles provided by the central detaching arms 5. The member 9' is also provided with a suitable eye 15, which is adapted to engage with a headed pin 16 provided upon the pole 1, and through the medium of which the whiffletree is pivotally connected with the pole.

It is to be understood that the flexible members 10 controlling the latches 6 are positioned in close proximity to the driver of the vehicle, and should a horse become unmanageable or attempt to run away, a pull upon this element will release the latch 6 and as forward pressure is exerted upon the whiffletree (through the medium of the animals) the knuckles 4 will be swung out of contact with the offsets 14 of the member 9' as will also the knuckles engaging the offset portion 11 of the members 8', thus entirely freeing the whiffletree from the vehicle and detaching the animals.

Having thus fully described the invention, what is claimed as new is:—

1. The combination with a vehicle pole and a whiffletree therefor, arms having offsets provided with knuckles upon the whiffletree, hook members having offsets engaging the knuckles, one of said hook members being provided with an eye, a pin upon the pole adapted to engage the eye, means for retaining the hook members in engagement with the knuckles, and means for swinging the knuckles out of engagement with the hook members.

2. The combination with a vehicle pole provided with a pin and a whiffletree, said whiffletree being provided upon one of its ends with a plurality of spaced chambers, arms having offsets provided with knuckles pivotally secured within said chambers, hook members provided with eyes engaging the knuckles, one of said hook members having its eye engaging the pin carried by the pole, means for securing the knuckle members in engagement with the hook members, and means for disconnecting the knuckle members from the hook members.

3. The combination with a vehicle pole having a pin, of a whiffletree, said whiffletree being provided with central and end chambers, arms having off sets provided with knuckles pivotally mounted within the chambers, the knuckles provided within the central and end chambers being spaced a distance from the walls of said chambers, hook members having off sets adapted to be contacted by the knuckles between the said knuckles and the walls of the chambers, the hook member contacted by the knuckles of the central chambers adapted to engage the pin of the vehicle pole, flexible elements connecting the end hook members with the body of the vehicle, the arms having their knuckles pivoted in each of the end chambers adapted to normally lie adjacent the arm pivotally connected within the adjacent central chamber, pivoted hook members normally overlying each pair of arms to retain the same upon the whiffletree, and flexible elements connecting these hook members whereby the latter may be swung from engagement with the arms.

In testimony whereof I affix my signature in presence of two witnesses.

JOHN S. WILLIAMS.

Witnesses:
  C. LONG,
  J. J. TOMPKINS.